(12) United States Patent
Oelmann et al.

(10) Patent No.: US 11,723,384 B2
(45) Date of Patent: *Aug. 15, 2023

(54) L-AMINO ACID-CONTAINING FEEDSTUFF ADDITIVE

(71) Applicant: EVONIK OPERATIONS GMBH, Essen (DE)

(72) Inventors: Ansgar Oelmann, Gelnhausen (DE); Hans Christian Alt, Gelnhausen (DE); Wilfried Blümke, Schöneck (DE); Franz Ulrich Becker, Freigericht-Horbach (DE); Christopher John Conrad, Omaha, NE (US)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,184

(22) Filed: Dec. 15, 2021

(65) Prior Publication Data

US 2022/0104519 A1    Apr. 7, 2022

Related U.S. Application Data

(62) Division of application No. 15/031,258, filed as application No. PCT/EP2014/071329 on Oct. 6, 2014, now abandoned.

(30) Foreign Application Priority Data

Oct. 24, 2013    (EP) .................................... 13190055

(51) Int. Cl.
*A23K 20/142* (2016.01)
*A23K 10/12* (2016.01)
(Continued)

(52) U.S. Cl.
CPC ............ *A23K 20/142* (2016.05); *A23K 10/12* (2016.05); *A23K 20/00* (2016.05); *A23K 20/158* (2016.05); *A23K 40/10* (2016.05); *A23K 40/30* (2016.05)

(58) Field of Classification Search
CPC .... A23K 20/142; A23K 20/158; A23K 40/10; A23K 40/30; A23K 10/12; A23K 20/00
See application file for complete search history.

(56) References Cited

U.S. PATENT DOCUMENTS 3,541,204 A * 11/1970 Sibbald et al. ........ A23K 40/35
514/564
3,615,681 A    10/1971 DuRoss et al.
(Continued)

FOREIGN PATENT DOCUMENTS

CN          102442919        5/2012
DE    10 2006 016 158      4/2007
(Continued)

OTHER PUBLICATIONS

English language translation of the International Search Report for corresponding international application PCT/EP2014/071329 filed Oct. 6, 2014.
(Continued)

*Primary Examiner* — W A Moore
(74) *Attorney, Agent, or Firm* — Law Office of Michael A. Sanzo, LLC (57) ABSTRACT

Granulated animal feed additives having high bulk density were obtained by adding a surface-active substance to a fermentation broth containing amino acid before spray-drying, wherein low residual moisture levels were achieved at high spray rates and low granulator temperatures.

20 Claims, 1 Drawing Sheet

(51) Int. Cl.
    *A23K 40/30*     (2016.01)
    *A23K 20/158*    (2016.01)
    *A23K 40/10*     (2016.01)
    *A23K 20/00*     (2016.01)

(56) References Cited

U.S. PATENT DOCUMENTS

| | | | |
|---|---|---|---|
| 3,759,789 | A | 9/1973 | Watanabe et al. |
| 4,275,157 | A | 6/1981 | Tosaka et al. |
| 5,275,940 | A | 1/1994 | Kino et al. |
| 5,431,933 | A | 7/1995 | Binder et al. |
| 5,567,606 | A | 10/1996 | Hayashi et al. |
| 5,622,710 | A | 4/1997 | Binder et al. |
| 5,770,409 | A | 6/1998 | Pfefferle et al. |
| 5,840,358 | A | 11/1998 | Hofler et al. |
| 5,840,551 | A | 11/1998 | Werning et al. |
| 5,990,350 | A | 11/1999 | Stevens et al. |
| 6,013,286 | A | 1/2000 | Klose |
| 6,238,728 | B1 | 5/2001 | Ishiguri et al. |
| 6,451,903 | B1 | 9/2002 | Asano et al. |
| 6,756,510 | B1 | 6/2004 | Binder et al. |
| 6,797,291 | B2 | 9/2004 | Richardson |
| 7,416,740 | B2 | 8/2008 | Kushiki et al. |
| 7,521,080 | B2 | 4/2009 | Alt et al. |
| 8,580,853 | B2 | 11/2013 | Phykitt |
| 8,802,400 | B2 | 8/2014 | Lotter et al. |
| 9,023,347 | B2 | 5/2015 | Lotter et al. |
| 11,076,616 | B2 * | 8/2021 | Oelmann ............... A23K 40/30 |
| 2003/0165611 | A1 | 9/2003 | Chiavazza et al. |
| 2004/0115304 | A1 | 6/2004 | Dubner et al. |
| 2007/0082031 | A1 | 4/2007 | Lotter et al. |
| 2007/0292919 | A1 | 12/2007 | Holt et al. |
| 2009/0092704 | A1 | 4/2009 | Gately et al. |
| 2009/0280542 | A1 | 11/2009 | Bathe et al. |
| 2009/0311758 | A1 | 12/2009 | Jessberger et al. |
| 2010/0261257 | A1 | 10/2010 | Bathe et al. |
| 2010/0310714 | A1 * | 12/2010 | Lotter ................... A23K 40/10 426/7 |
| 2016/0255863 | A1 | 9/2016 | Oelmann et al. |

FOREIGN PATENT DOCUMENTS

| | | |
|---|---|---|
| EP | 0 288 779 | 7/1987 |
| EP | 0 923 878 | 6/1996 |
| EP | 0 743 016 | 11/1996 |
| EP | 1 331 220 | 7/2003 |
| EP | 1 752 543 | 2/2007 |
| GB | 1 217 365 | 12/1970 |
| GB | 1 439 121 | 6/1976 |
| GB | 1 439 728 | 6/1976 |
| GB | 2 293 304 | 3/1996 |
| WO | WO 2004/054381 | 7/2004 |
| WO | WO 2007/141111 | 12/2007 |

OTHER PUBLICATIONS

English language translation of the Written Opinion of the International Searching Authority for corresponding international application PCT/EP2014/071329 filed Oct. 6, 2014.
English language translation of the International Preliminary Report on Patentability for corresponding international application PCT/EP2014/071329 filed Oct. 6, 2014.
European Search Report for EP 13 19 0055, (priority application to corresponding international application PCT/EP2014/071329 filed Oct. 6, 2014.), with partial machine translation attached.
English language translation of the International Search Report for international application PCT/EP2014/071309 filed Oct. 6, 2014 (corresponds to related U.S. Appl. No. 15/031,260).
English language translation of the Written Opinion of the International Searching Authority for international application PCT/EP2014/071309 filed Oct. 6, 2014 (corresponds to related U.S. Appl. No. 15/031,260).
English language translation of the International Preliminary Report on Patentability for international application PCT/EP2014/071309 filed Oct. 6, 2014 (corresponds to related U.S. Appl. No. 15/031,260).
European Search Report for EP 13 19 0052, (priority application to international application PCT/EP2014/071309 filed Oct. 6, 2014), with partial machine translation attached.
Epand, et al., "Bacterial lipid composition and the antimicrobial efficacy of cationic steroid compounds (Ceragenins)," *Biochimica et Biophysica Acta* 1768:2500-2509 (accepted May 2007).
Hull, et al., "Composition of Corn Steep Water during Steeping," *J. Agric. Food Chem.* 44:1857-1863 (Jul. 1996).
Neidhardt and Umbarger, from chapter 3 in Neidhardt F.C. *Escherichia coli* and *Salmonella*: Cellular and Molecular Biology 2nd edition, vol. 1, American Society of Microbiology (ASM) Press BioNumber Details Page and Table 1; (1996).
Ozaki, et al., "Production of Lysine by Pyruvate Kinase Mutants of *Brevibacterium flavum,*" *Agric. Biol. Chem.* 47(7):1569-1576 (Jan. 1983).
Printout of Wikipedia entry "Defoamer" (printed Apr. 10, 2017).
Shiio, et al., "Studies on Mechanisms for Lysine Production by Pyruvate Kinase-Deficient Mutants of *Brevibacterium flavum,*" *Agric. Biol. Chem.* 48(6):1551-1558 (Dec. 1983).
Restriction Requirement for related U.S. Appl. No. 15/031,260, dated Apr. 16, 2018.
Response to Restriction Requirement for related U.S. Appl. No. 15/031,260, filed Jul. 21, 2018.
Amendment to Accompany Response to Restriction Requirement for related U.S. Appl. No. 15/031,260, filed Jul. 21, 2018.
Office Action for related U.S. Appl. No. 15/031,260, dated Jan. 24, 2019.
Amendment and Response to Office Action for related application U.S. Appl. No. 15/031,260, filed Jun. 2, 2019.
Final Rejection for related application U.S. Appl. No. 15/031,260, dated Aug. 27, 2019.
Amendment & Response to Accompany RCE for related application U.S. Appl. No. 15/031,260, filed Dec. 27, 2019.
Non Final Office Action for related U.S. Appl. No. 15/031,260, dated Mar. 31, 2020.
Amendment and Response to Office Action for related application U.S. Appl. No. 15/031,260, filed Jul. 14, 2020.
Final Office Action for related U.S. Appl. No. 15/031,260, dated Sep. 9, 2020.
Notice of Appeal for copending application U.S. Appl. No. 15/031,260, filed Dec. 9, 2020.
Appeal Brief for copending application U.S. Appl. No. 15/031,260, filed Feb. 9, 2021.
Notice of Allowance for copending application U.S. Appl. No. 15/031,260, dated Mar. 25, 2021.
Machine translation of EP 13609904A1 published Nov. 2003 (Year: 2003).
Machine translation WO 2007/141111 published Dec. 2007 (Year: 2007).

* cited by examiner

L-AMINO ACID-CONTAINING FEEDSTUFF ADDITIVE

CROSS REFERENCE TO RELATED APPLICATIONS

The present application is a division of U.S. Ser. No. 15/031,258, filed in the US on Apr. 21, 2016 as US national stage of international application PCT/EP2014/071329, which had an international filing date of Oct. 6, 2014 and which was published in German on Apr. 30, 2015. Priority is claimed to European application EP 13190055.7, filed on Oct. 24, 2013. The content of these prior applications is hereby incorporated by reference in its entirety.

The invention relates to fermentation broth-based feed additives containing L-amino acid, which comprise a surface-active substance, and also a granulation process for preparing these feed additives.

PRIOR ART

Animal feeds are supplemented with individual amino acids to meet the needs of the animals. The substance which is currently predominantly employed for supplementing animal feeds, for example with L-lysine, is L-lysine monohydrochloride, with an L-lysine content of ca. 80%. Since L-lysine is produced by fermentation, it must, to prepare the monohydrochloride, first and foremost be separated in complicated method steps from all remaining constituents of the crude fermentation broth, then converted to the monohydrochloride, and the latter must be crystallized. This generates a large number of by-products and the reagents required for processing in the form of waste. Since high purity of the animal feed supplement is not always required and since, moreover, the fermentation by-products still frequently contain nutritionally effective substances of value, there has, therefore, been no lack of attempts in the past to avoid the complicated production of feed amino acids, particularly of pure L-lysine monohydrochloride, and to convert the crude fermentation broth into a solid animal feed in a more cost-effective manner.

EP 0 533 039 relates to methods for preparing a fermentation broth-based amino acid animal feed supplement, wherein the supplement may be obtained directly from the fermentation broth by means of spray-drying. In one variant, some of the biomass in this case is removed before the spray-drying step.

EP 0 615 693 discloses a method for preparing a fermentation broth-based animal feed additive, in which the fermentation broth, optionally after removal of some of the constituents, is spray-dried to give fine particles of which at least 70% by weight have a maximum particle size of 100 μm, and furthermore these fine particles are enlarged in a second stage to give granules comprising the fine particles at not less than 30% by weight.

According to GB 1 439 728 a concentrate containing L-lysine is prepared from a fermentation broth, which, before concentration, is acidified with HCl to a pH of ca. 6.4 and to which bisulphite is added for stabilization purposes. After the evaporation, the product is further acidified to a pH of 4.0 and the desired product is obtained by spray-drying.

A feed additive based on fermentation broth is described in EP 0 809 940 B1 (U.S. Pat. No. 5,840,358), which is obtained in granulated form in a fluidized bed. Dust abrasion in the subsequent processing is, however, a disadvantage of this product.

For this reason, the addition of additives in the further processing is described in GB 2 293 304 A, such as the spraying of aerosols of mineral oils for suppression of dust formation.

WO 2004/054381 describes the preparation of a lysine-containing feedstuff, based on fermentation broth, and the addition of additives in the processing, wherein the addition of mineral oils, vegetable oils or mixtures of vegetable oils, particularly soybean oil, olive oil and mixtures of soybean oil with lecithin are mentioned which influence the abrasion of the granules and the dust formation.

A disadvantage of such granulated products is generally the low subsequent bulk density of the granulate which cannot be influenced, which results in disadvantages in packing volume and related increased transport costs.

It is described in WO 2004/054381 that an increase in the bulk density may be achieved by the subsequent addition of oil, but an additional method step is required in this case.

SUMMARY OF THE INVENTION

Therefore, it was an object of the invention to provide a method by which the bulk density of the spray-granulated product may already be increased during the preparation in the granulation process.

It was a further object of the present invention to provide an improved and preferably an energy-efficient granulation process.

Surprisingly, it has been found that the object of the invention is achieved by the addition of a surface-active component to the fermentation broth before carrying out the spray-drying, namely that a comparatively high bulk density of the product may be achieved and at the same time the granulation properties can be improved.

The improved granulation properties observed particularly consist of low residual moisture content at high spray rates and low granulation temperatures can be achieved by the addition of the surface-active component to the fermentation broth before carrying out the spray-drying, which enables more rapid and at the same time more energy-efficient granule production.

The comparatively high bulk density of the product is a result of fewer cavities and a more compact structure of the granulate, as cross sections of the granulate show.

The more compact structure of the granulate and the higher spray rates achievable in the drying of the fermentation broth is probably a result of the reduced surface tension and consequent increased exchange surface and increased evaporation rate following addition of the surface-active substance.

Figure 1A:
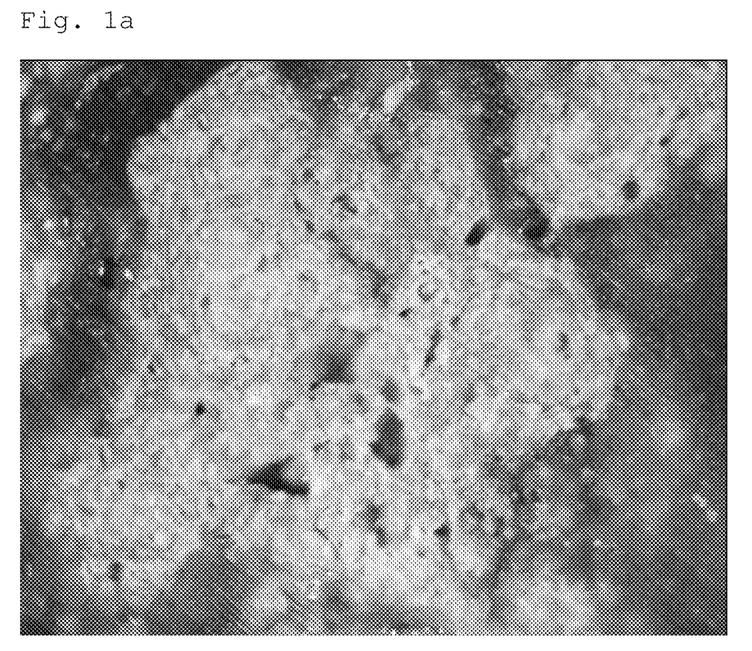
FIG. 1a shows a cross section of a granulate embedded in synthetic resin which was obtained from fermentation broth without the addition of a surface-active substance.
Figure 1B:
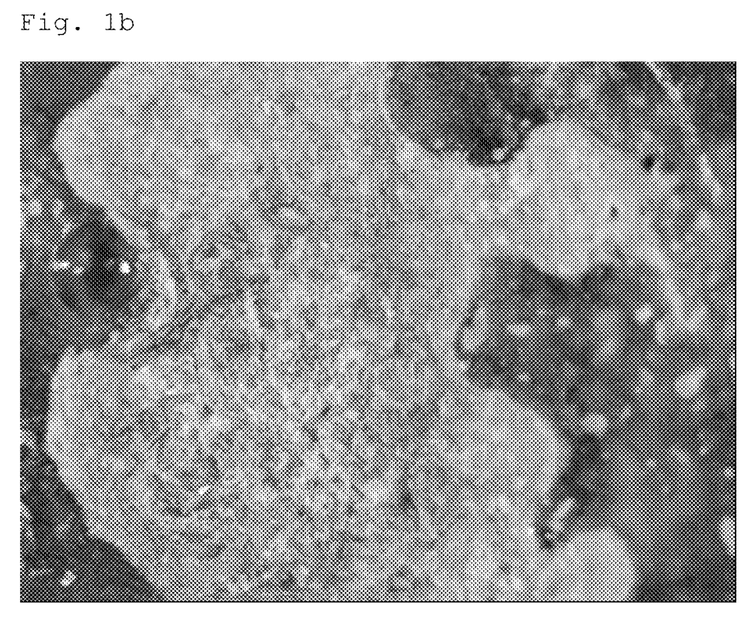
FIG. 1b shows a cross section of a granulate to which corn steep liquor had been added before carrying out spray granulation (FIG. 1b).

Distinct cavities are visible in FIG. 1a, while the granulate in FIG. 1b has a more compact structure without visible cavities.

SUBJECT MATTER OF THE PRESENT INVENTION

The present invention therefore provides a method for preparing a fermentation broth-based feed additive containing L-amino acid, characterized in that a fermentation broth containing L-amino acid, which has a water content of 35 to 75% by weight and a content of surface-active substance of 0.025 to 20% by weight, is converted by drying into a particulate composition.

The present invention also relates to a method for preparing a fermentation broth-based feed additive containing L-amino acid, comprising the following steps:
a) providing a fermentation broth containing L-amino acid,
b) optionally adjusting the fermentation broth containing L-amino acid to a water content of 35 to 70% by weight,
c) adding a surface-active substance to the fermentation broth,
d) drying the resulting mixture to give a particulate composition, wherein a granulate is preferably obtained,
e) optionally adjusting the particle size, particularly by rolling, sieving etc.

The fermentation broth containing L-amino acid is preferably obtained by fermentation of an L-amino acid-producing microorganism in an aqueous culture medium under aerobic conditions. Preferred fermentation methods according to the invention are further illustrated in detail below.

Fermentation broth is understood to mean a fermentation medium in which a microorganism has been cultivated for a certain time and at a certain temperature. The fermentation medium or the media used during the fermentation comprises/comprise all of the substances or components which ensure proliferation of the microorganism and formation of the desired amino acid.

On completion of the fermentation, the resulting fermentation broth accordingly comprises the biomass (=cell mass) of the microorganism produced as a result of the proliferation of the cells of the microorganism (e.g. coryneformes bacterium) and the L-amino acid (particularly L-lysine) formed during the fermentation, the organic by-products formed in the course of the fermentation and the constituents of the fermentation medium/fermentation media used which are not consumed by the fermentation and the ingredients such as vitamins like biotin, amino acids such as homoserine or salts such as magnesium sulphate.

Organic by-products include substances which are generated, if applicable, in addition to the target product, from the microorganisms used in the fermentation and are optionally separated. These include other L-amino acids which, compared to the desired L-amino acid (particularly L-lysine), account for less than 30%, 20% or 10%. These further include organic acids which bear one to three carboxyl groups such as acetic acid, lactic acid, citric acid, malic acid or fumaric acid. Finally, sugars such as trehalose are also included here.

Suitable fermentation broths for industrial purposes typically have an L-amino acid content (particularly L-lysine content) of 40 g/kg to 180 g/kg or 50 g/kg to 150 g/kg. The biomass content (as dried biomass) in the fermentation broth is generally 20 to 50 g/kg, but in low biomass fermentation the biomass content can also be below this level.

The fermentation broth preferably comprises an L-amino acid selected from L-lysine, L-methionine, L-threonine, L-valine or L-tryptophan. The fermentation broth particularly preferably comprises the L-amino acid L-lysine.

In a particularly preferred embodiment according to the invention, the L-amino acid is L-lysine, wherein the method comprises an additional method step, which is carried out before the start of the drying, in which ammonium sulphate and/or sulphuric acid is added to the fermentation broth, in order to establish a sulphate/L-amino acid ratio of at least 0.5, preferably 0.85 to 1.2. This particularly preferred embodiment is further explained in detail below.

The fermentation broth in a preferred embodiment according to the invention is the direct product of a fermentation process using L-amino acid-producing bacteria.

The biomass can, however, optionally be partially or completely removed from the fermentation broth before or after addition of the surface-active component. In a preferred embodiment according to the invention, at most 80% by weight, particularly preferably at most 50% by weight, in particular at most 30, 20 or 10% by weight of the biomass is removed before carrying out the drying to give a particulate composition. In a particularly preferred embodiment according to the invention, the entire biomass remains present in the fermentation broth.

The biomass may be removed, if desired, particularly by centrifugation, filtration or decanting or by combinations of these methods. In a preferred embodiment according to the invention, the biomass is removed by ultrafiltration.

The organic by-products dissolved in the fermentation broth and the dissolved constituents of the fermentation medium (ingredients) which are not consumed remain at least in part in the product (>0% by weight), at preferably not less than 25% by weight, particularly preferably not less than 50% by weight and very particularly preferably not less than 75% by weight. Optionally, these also remain entirely (100% by weight) or virtually entirely, i.e. >95% by weight or >98% by weight, in the product. In this context, "fermentation broth-based" means that the product comprises at least some of the constituents of the fermentation broth.

The fermentation broth used according to the invention preferably has the following properties on completion of the fermentation:
a) biomass content of 1 to 5% by weight, preferably 2 to 4.5% by weight, particularly preferably 2.5 to 3.5% by weight,
b) L-amino acid content, preferably L-lysine, (as amino acid base) of 5 to 20% by weight,
c) solids content (including biomass) of 10 to 30% by weight, preferably 15 to 25% by weight,
d) preferably a % by weight ratio of sulphate to L-amino acid, particularly L-lysine, of 0.8 to 1.2,
e) pH of 3.5 to 7.0, preferably 4.0 to 5.0.

The preparation of such a fermentation broth is further described below.

"Solids content" in accordance with the invention is understood to mean the mass which remains on complete removal of the liquid. This dry mass also includes, in addition to suspended substances if applicable (such as the biomass), dissolved substances which only crystallize out or precipitate on drying. The solids content is in this respect complementary to the water or moisture content.

The fermentation broth used in accordance with the invention can optionally already contain a sufficient amount of surface-active substance after completion of the fermentation. This may be achieved by adding a sufficient amount of surface-active substance to the fermentation medium already before the start of the fermentation or by adding appropriate surface-active substance during the fermentation.

In a preferred embodiment, however, the fermentation broth does not comprise, or only comprises a relatively low amount of surface-active substance after completion of the fermentation. The surface-active substance or the majority of the surface-active substance is accordingly added to the fermentation broth after completion of the fermentation.

The surface-active substance which is already present in the fermentation broth after completion of the fermentation may be, for example, an antifoaming agent.

Before the start of the drying, the fermentation broth preferably has a water content of 35 to 70% by weight, particularly preferably 35 to 50% by weight. This water content may be adjusted, if required, particularly by evaporation of the fermentation broth, for example by means of a rotary evaporator, a thin film evaporator or a falling film evaporator, by reverse osmosis or by nanofiltration. The biomass content, the L-amino acid content and the solids content in the fermentation broth also increase accordingly during the concentration.

The "surface-active substance" in the context of the present application can be a pure substance which consists exclusively of a surface-active compound. However, it may also be a mixture of different surface-active compounds. In accordance with the invention, "surface-active substance" is however also understood to mean a component comprising a surface-active compound or a mixture of different surface-active compounds in a significant quantity. The surface-active compound(s) is/are present in the component in this case preferably in an amount of at least 3% by weight, particularly at least 5% by weight, particularly preferably at least 10% by weight. In a preferred embodiment, the surface-active compound(s) is/are present in the component at not less than 20% by weight, preferably not less than 25% by weight, particularly not less than 40% by weight.

The surface-active substance in accordance with the invention is preferably selected from the group consisting of corn steep liquor, lipids, antifoaming agents and surfactants and also mixtures thereof.

The antifoaming agent is preferably selected from polysiloxane derivatives, mono- and polyglycols, phospholipids and fatty acid glycerides.

The polysiloxane derivative can take in particular the form of a polyalkylsiloxane, especially a polydimethylsiloxane.

The polyglycol is preferably a polymer composed of oxyethylene and/or oxypropylene units, preferably a copolymer of oxyethylene and oxypropylene units, or is a compound comprising oxyethylene and/or oxypropylene units, such as a fatty acid alkylpolyglycol ester.

The phospholipid is preferably a phosphatidylcholine (lecithin).

The fatty acid glyceride may particularly take the form of a mono- or diglyceride, especially a mono- or diglyceride in which the acid residue is selected from acetic acid, lactic acid, citric acid, tartaric acid and mixtures thereof.

The corn steep liquor used according to the invention preferably has a dry mass of at least 40% by weight, preferably 45 to 55% by weight, and preferably has a residual sugar content of at most 2% by weight. Corn steep liquor comprises phosphatidylcholine as surface-active constituent.

The lipid which may be used in accordance with the invention is preferably selected from mineral oils, vegetable oils and mixtures thereof. The oil used is particularly preferably soybean oil, olive oil, silicone oil or mixtures thereof.

In a particularly preferred embodiment according to the invention, the surface-active substance used is phosphatidylcholine or a component containing phosphatidylcholine, preferably corn steep liquor.

The surface-active substance in the fermentation broth before the start of the drying is preferably present in an amount of 0.025 to 20% by weight, 0.1 to 20% by weight, 0.2 to 20% by weight, 0.5 to 20% by weight or 1 to 20% by weight. Preferred ranges here are 0.2 to 15% by weight, 0.3 to 15% by weight, 0.5 to 15% by weight and 1 to 10% by weight.

If a polyglycol, particularly a fatty acid alkylpolyglycol ester, or a phospholipid, particularly a lecithin, or mixtures thereof, are used as surface-active substance, a concentration of surface-active substance is preferably set to 0.1 to 5% by weight, particularly 0.2 to 4% by weight, preferably 0.25 to 2% by weight.

Preference is generally given to using this amount of surface-active substance if the surface-active substance is a component which comprises at least 50% by weight, particularly at least 70% by weight, of surface-active compounds.

If corn steep liquor, optionally in combination with other surface-active substances, is used as surface-active substance, a concentration of surface-active substance is preferably set to 0.1 to 10% by weight, particularly 0.5 to 5% by weight, preferably 1 to 3% by weight.

Preference is generally given to using this amount of surface-active substance if the surface-active substance is a component which comprises less than 30% by weight, particularly 3 to 30% by weight or 3 to 20% by weight, of surface-active compounds.

In a preferred embodiment according to the invention, the fermentation broth before the start of the drying has the following properties:
a) biomass content of 2 to 12% by weight, preferably 3 to 10% by weight, particularly 4 to 8% by weight;
b) L-amino acid content, preferably L-lysine, (as amino acid base) of 12 to 48% by weight, particularly 20 to 40% by weight;
c) solids content (including biomass) of 25 to 70% by weight, preferably 35 to 60% by weight;
d) surface-active substance content of 0.025 to 20% by weight, particularly 0.1 to 20% by weight, preferably 0.3 to 15% by weight;
e) % by weight ratio of sulphate to L-amino acid, particularly L-lysine, of 0.8 to 1.2;
f) pH of 3.5 to 7.0, preferably 4.0 to 5.0.

To set a desired L-amino acid concentration in the product, an additive may be added to the fermentation broth provided or to the concentrated fermentation broth, depending on requirements, in order to increase or decrease the L-amino acid content. The additive may also alternatively and/or additionally be added during the drying or granulation process.

In order to increase the L-amino acid content, the relevant L-amino acid is preferably added in the form of a concentrate, or optionally as a largely pure substance or salt thereof, in liquid or solid form. In order to decrease the L-amino acid content, ammonium sulphate is preferably added. The additive, if used, is preferably added to the fermentation broth in an amount of 0.1 to 10% by weight, preferably 0.1 to 5% by weight, or is preferably added in an amount that adjusts the L-amino acid concentration in the final product to 40 to 60% by weight, particularly 45 to 55% by weight.

To obtain a particulate composition, the drying may be carried out particularly by freeze-drying, preferably by a spray process, particularly spray-drying or spray granulation.

Optionally, further processing steps may follow the drying of the fermentation broth performed according to the invention, in particular, one or more granulation steps, particularly if a granulate is not obtained directly from the drying process.

In a particularly preferred embodiment of the invention, however, the fermentation broth is converted directly into a granulate in one process step, such that a subsequent granulation is not necessary. The direct conversion into a granulate is preferably carried out by a spray granulation method, particularly preferably by application of a spray granulation method using a circulating fluidized bed as described in patent application WO 2005/006875.

In the spray granulation, dust formed downstream of the granulation is preferably completely or at least partially recirculated into the spray granulation chamber.

Furthermore, the granulation temperature is preferably regulated such that the inlet temperature is 200 to 300° C., preferably 250 to 275° C. and the outlet temperature is 60 to 100° C., preferably 70 to 90° C.

The granulate obtainable preferably has an L-amino acid content of 40 to 60% by weight, particularly 45 to 55% by weight, particularly preferably 48 to 52% by weight, and a water content (residual moisture content) of at most 5% by weight, preferably at most 3.5% by weight.

A particulate composition is obtained by means of the drying process which is preferably free-flowing and also can be fine-grained or coarse-grained.

The free-flowing, fine-grained powder may in turn be converted into a coarse-grained, free-flowing and largely dust-free product, which can be stored, by suitable compacting or granulating processes.

The granulates may be prepared, for example, by the methods according to EP-B 0 615 693 or EP-B 0 809 940, U.S. Pat. No. 5,840,358 or WO 2005/006875 or WO 2004/054381.

"Free-flowing" is understood to mean powders which flow out unhindered from a series of glass efflux vessels having different size outflow openings at least from a vessel having a 5 mm (millimetre) opening (Klein: Seifen, Öle, Fette, Wachse 94, 12 (1968)).

The present invention further relates to a feed additive containing a preferably granular L-amino acid, particularly L-lysine, which is obtainable by a method according to the invention.

The present invention further relates to granular feed additives comprising the following features:
a) L-amino acid content, preferably L-lysine, (calculated as the amino acid base) of at least 20% by weight, preferably 25 to 60% by weight, particularly 30 to 60 or 40 to 60% by weight, particularly preferably 45 to 55% by weight,
b) mean particle diameter of 60 to 2500 µm, preferably 60 to 1500 µm;
c) biomass content of at least 3 or 4% by weight, preferably at least 5 or 6% by weight, particularly preferably at least 7% by weight, particularly 3 to 12% by weight, 4 to 12% by weight, 5 to 12% by weight, 6 to 12% by weight or 7 to 12% by weight;
d) surface-active substance content of 0.04 to 35% by weight, preferably 0.15 to 30% by weight, particularly preferably 0.5 to 15% by weight;
e) preferably a water content (residual moisture) of at most 4.5% by weight, particularly at most 3.5% by weight;
f) preferably a layer of edible oil coating the particle.

The stated mean particle diameter here refers to the arithmetic mean.

Feed additives according to the invention preferably have a proportion of particles of >=70, 75, 80, 90, 95, 97% by weight having a particle diameter of >63 µm to <2500 µm or a proportion of >=70, 75, 80, 85, 90, 95, 97% by weight having a particle diameter of >63 to <2000 µm or a proportion of >=70, 75, 80, 85, 90, 95, 97% by weight having a particle diameter of >100 to <1700 µm. The proportion of dust, i.e. particles having a particle size <63 µm, is preferably 20% by weight or less, 15% by weight or less, 10% by weight or less, 5% by weight or less, 3% by weight or less, 2% by weight, 0 to 1% by weight, 0.5% by weight or less.

At least 75% by weight of the particles of the composition obtained particularly preferably have a particle diameter of >63 µm to <2500 µm, preferably >63 µm to <2000 µm, wherein the proportion of the particles having a particle diameter of <63 µm is preferably 20% by weight or less.

The bulk density of the preferred products is generally 600 to 800 kg/m$^3$.

The particle size distribution is preferably measured by sieve analysis in a Hosokawa Alpine air jet sieving machine, Type 200 LS-N (sieve set: mesh sizes 20, 32, 45, 63, 100, 150, 200, 250, 280, 300, 400, 500, 600, 630, 710, 800, 1000, 1180, 1400, 1600 and 2000 µm; sieving time: 3 min.).

Alternatively, the particle size may also be determined for example by laser diffraction spectrometry. Possible methods are described in the text book "TeilchengrMenmessung in der Laborpraxis" [Particle size measurement in the laboratory] by R. H. Müller and R. Schuhmann, Wissenschaftliche Verlagsgesellschaft Stuttgart (1996) and in the text book "Introduction to Particle Technology" by M. Rhodes, Wiley & Sons (1998).

Advantageous in the granulation or compacting process is the use of customary organic or inorganic auxiliaries or carriers such as starch, gelatin, cellulose derivatives or similar substances, which are used in food or feed processing as binding agents, gelling agents or thickeners, or other substances such as silicas, silicates (EP-A 0 743 016) or stearates.

A product with the desired particle size is optionally obtained from the resulting particulate composition or resulting granulate by sieving, rolling, dust separation, grinding or combinations thereof.

Granular feed additives according to the invention are preferably further characterized in that they are coated with an oil, as described in WO 04/054381 for example, wherein the oil is preferably selected from vegetable oil (particularly olive oil, sunflower oil, soybean oil or soybean oil/lecithin mixtures), animal oil or fat and oil obtained from microorganisms by fermentation. An increased abrasion resistance of the product and a reduction in the dust content is achieved by treatment of the surfaces with the oils mentioned.

Alternatively, the product may also be applied to a customary organic or inorganic support material known in feed processing, such as silicas, silicates, meals, brans, starches, sugars or others and/or be mixed and stabilized with customary thickeners or binders. Examples of applications and methods for this purpose are described in the literature (Die Muhle+Mischfuttertechnik [Milling and compound feed technology] 132 (1995) 49, page 817).

Finally, the product may also be finished by a coating process with film formers such as metal carbonates, silicas, silicates, alginates, stearates, starches, rubbers and cellulose ethers as described in DE-C 41 00 920.

The biomass in feed additives according to the invention preferably comprises bacteria of the genus *Corynebacterium* or the genus *Escherichia* and/or cell debris from these bacteria and particularly preferably consists largely of these.

The L-amino acid content in feed additives according to the invention is preferably at least 30% by weight, preferably at least 40% by weight, particularly 40 to 60% by weight, particularly preferably 45 to 55% by weight.

The L-amino acid in the feed additives according to the invention is preferably selected from the group consisting of L-lysine, L-methionine, L-threonine, L-tryptophan and L-valine and also mixtures thereof; particularly preferably the L-amino acid is L-lysine.

The feed additive according to the invention preferably takes the form of a fermentation broth-based feed additive.

The surface-active substance present in granular feed additives according to the invention is preferably selected from the surface-active substances mentioned above.

Provided that the surface-active substance is a polyglycol, particularly a fatty acid alkylpolyglycol ester, or a phospholipid, particularly a lecithin, or mixtures thereof, the surface-active substance in the feed additive is preferably present in an amount of 0.15 to 10% by weight, particularly 0.3 to 6% by weight, particularly preferably 0.4 to 4% by weight.

Preference is generally given to this amount of surface-active substance provided that the surface-active substance is a component which comprises at least 50% by weight, particularly at least 70% by weight, of surface-active compounds.

Provided that the surface-active substance is corn steep liquor, optionally in combination with other surface-active substances, the surface-active substance in the feed additive is preferably present in an amount of 3 to 25% by weight, particularly preferably 6 to 20% by weight.

Preference is generally given to this amount of surface-active substance provided that the surface-active substance is a component which comprises less than 30% by weight, particularly 3 to 30% or 3 to 20% by weight, of surface-active substance.

The distribution of surface-active substance in the particle is preferably homogeneous, wherein "homogeneous" is understood to mean that no major difference in concentration of the surface-active substance is found between any two fractions of the particle.

The deviation in the amount of surface-active substance in any two fractions of the particle, which can take the form, for example, of any cubes having a volume of 10×10 μm, is preferably at most 30%, preferably at most 25 or 20%, particularly preferably at most 10, 5 or 3%.

The homogeneous distribution of the surface-active substance is ensured by the manner of preparation of the feed additive.

The particle density of the feed additive is preferably at least 1.138 g/cm$^3$, particularly preferably at least 1.140 g/cm$^3$, especially preferably at least 1.142 or 1.144 g/cm$^3$. Preferred ranges in this context are 1.138 to 1.160 g/cm$^3$, particularly 1.140 to 1.155 g/cm$^3$, especially 1.142 to 1.154 g/cm$^3$ or 1.144 to 1.152 g/cm$^3$.

The bulk density of the feed additive is preferably at least 600 kg/m$^3$, particularly 600 to 800 kg/m$^3$.

The bulk density is preferably determined as follows: An empty measuring cylinder (250 ml volume) is placed on a balance, filled with the granular product and the weight per unit volume is then determined.

To determine the particle density, the void spaces in the measuring cylinder are filled with methanol. The void volumes can thus be determined by the increase in weight and the known density of methanol (0.7918 g/ml). The difference between total volume and the volume of the methanol gives the particle volume. The particle density is then obtained, by basing the weight of the particle previously determined not on the total volume of the measuring cylinder but on the particle volume determined.

Alternatively, the particle density can also be determined using a pycnometer. The particle density is determined in this case by gas displacement. Inert gases such as helium or nitrogen are preferably used as displacement medium. A commercially available pycnometer in this connection, for example, is the helium pycnometer AccuPyc 1340 (mimetrics).

Granular feed additives according to the invention are preferably characterized in that they comprise the L-amino acid L-lysine, wherein said L-amino acid is preferably present at least in part as a sulphate salt, in which the molar ratio of sulphate to L-lysine is preferably at least 0.5, particularly preferably 0.8 to 1.2.

In the preferred embodiment in which the L-amino acid is L-lysine, feed additives according to the invention preferably have a pH of 3.5 to 6.5, particularly 4.0 to 5.0, preferably 4.2 to 4.8, measured in aqueous suspension. For measurement of the pH, a 10% by weight suspension in deionized water is prepared and the pH measured with a pH electrode at 25° C. The measured value becomes constant after ca. 1 minute.

The water content of the feed additive according to the invention is preferably between 0.1% by weight and no more than 5% by weight. The water content is preferably at most 4% by weight, particularly preferably at most 3% by weight and especially preferably at most 2.5% by weight. Water contents of at most 2% by weight are also possible.

Feed additives according to the invention are further preferably characterized in that they have a very compact structure, wherein "compact structure" is understood to mean that they have relatively few cavities. This is not least as a result of the use of the surface-active substance. Feed additives according to the invention are preferably characterized in that they have cavities less than 25% by volume, particularly less than 20% by volume, particularly preferably less than 15% by volume, especially preferably less than 10% by volume.

The present invention further relates to the use of a granular feed additive according to the invention for preparing feedstuff.

Preparation of the Fermentation Broth Containing L-Amino Acid

The preparation by fermentation of L-amino acids such as L-lysine, L-methionine, L-threonine, L-tryptophan, L-valine, particularly L-lysine, is achieved by cultivation by fermentation of an amino acid-overproducing bacterial strain. The fermentation is preferably conducted with coryneform bacteria, particularly from the genus *Corynebacterium*, particularly preferably of the type *Corynebacterium glutamicum*, and/or from the genus *Escherichia*, particularly preferably of the type *Escherichia coli*, by a so-called fed-batch process (feed processes). Alternatively, the fermentation can also be carried out continuously or batchwise in a batch process (batch cultivation) or repeated fed batch process (repetitive feed process) with the aim to produce L-amino acids (particularly L-lysine). The fermentation medium used is optimized according to the requirements of the respective production strain. A general review of known cultivation methods is available in the textbook by Chmiel (Bioprozesstechnik 1. Einführung in die Bioverfahrenstechnik [Bioprocess technology 1. Introduction to Bioprocess Technology] (Gustav Fischer Verlag, Stuttgart, 1991)) or in the textbook by Storhas (Bioreaktoren and periphere Einrichtungen [Bioreactors and Peripheral Devices] (Vieweg Verlag, Braunschweig/Wiesbaden, 1994)).

The culture medium or fermentation medium to be used has to satisfy the demands of the particular strains in a suitable manner. Descriptions of culture media of different microorganisms are present in the handbook "Manual of Methods for General Bacteriology", of the American Society for Bacteriology (Washington D. C, USA, 1981). The terms culture medium and fermentation medium or medium are mutually interchangeable.

The carbon sources used may be sugars and carbohydrates such as glucose, sucrose, lactose, fructose, maltose, molasses, sucrose-containing solutions from sugarbeet or sugarcane production, starch, starch hydrolysate and cellulose, oils and fats such as soybean oil, sunflower oil, groundnut oil and coconut fat, fatty acids such as palmitic acid, stearic acid and linoleic acid, alcohols such as glycerol, methanol and ethanol and organic acids such as acetic acid. These substances may be used individually or as a mixture.

The nitrogen sources used may be organic nitrogen compounds such as peptones, yeast extract, meat extract, malt extract, corn steep liquor, soybean meal and urea or inorganic compounds such as ammonia, ammonium sulphate, ammonium phosphate, ammonium carbonate and ammonium nitrate, preferably ammonia or ammonium sulphate. The nitrogen sources may be used individually or as a mixture.

The phosphorus sources used may be phosphoric acid, potassium dihydrogen phosphate or dipotassium hydrogen phosphate or the corresponding sodium salts.

The culture medium must additionally contain salts, for example in the form of sulphates of metals such as sodium, potassium, magnesium, calcium and iron, for example magnesium sulphate or iron sulphate, which are needed for growth. Finally, essential growth factors such as amino acids, for example homoserine, and vitamins, for example thiamine, biotin or pantothenic acid, may be used in addition to the substances mentioned above. Moreover, suitable precursors of the particular amino acid can be added to the culture medium. The feedstocks mentioned may be added to the culture in the form of a single mixture or may be fed in during the cultivation in a suitable manner.

For pH control of the culture, basic compounds such as sodium hydroxide, potassium hydroxide, ammonia or aqueous ammonia, preferably ammonia or aqueous ammonia, or acidic compounds such as phosphoric acid or sulphuric acid, are used in a suitable manner. The pH is generally adjusted to a value of 6.0 to 9.0, preferably 6.5 to 8.

To control the evolution of foam, it is possible to use antifoams, for example fatty acid polyglycol esters. To maintain the stability of the plasmids, suitable selective substances, for example antibiotics, can be added to the medium. In order to maintain aerobic conditions, oxygen or oxygenous gas mixtures, for example air, are introduced into the culture. The use of liquids enriched with hydrogen peroxide is likewise possible.

If appropriate, the fermentation is conducted at elevated pressure, for example at a pressure of 0.03 to 0.2 MPa. The temperature of the culture is normally 20° C. to 45° C. and preferably 25° C. to 40° C. In batch processes, the cultivation is continued until a maximum of the desired amino acid has formed. This aim is normally achieved within 10 hours to 160 hours. In continuous processes, longer cultivation times are possible. To ferment suitably large production fermenter volumes of several hundred cubic metres, a plurality of upstream growth fermenter steps with successively increasing fermenter volumes are necessary.

Examples of suitable fermentation media are found, inter alia, in the patent specifications U.S. Pat. Nos. 5,770,409, 5,840,551 and 5,990,350, 5,275,940 or U.S. Pat. No. 4,275, 157. Further examples of fermentation media are found in Ozaki and Shiio (Agricultural and Biological Chemistry 47(7), 1569-1576, 1983) and Shiio et al. (Agricultural and Biological Chemistry 48(6), 1551-1558, 1984). Methods for determining L-lysine and other L-amino acids are known from the prior art. The analysis can proceed, for example, as described in Spackman et al. (Analytical Chemistry, 30, (1958), 1190) by anion-exchange chromatography with subsequent ninhydrin derivatization, or it can proceed via reversed-phase HPLC, as described by Lindroth et al. (Analytical Chemistry (1979) 51: 1167-1174).

The fermentation broth thus produced is subsequently processed in accordance with the invention.

The biomass or the fermentation broth comprising the biomass is preferably thermally inactivated during a suitable method step before the biomass is completely or partially removed.

Preferred Method Procedure in the Production of L-Lysine

In the case that the L-amino acid produced is L-lysine, an additional process step is preferably carried out, as already mentioned previously, which is carried out before the start of the drying process, in which ammonium sulphate and/or sulphuric acid are added to the fermentation broth, in order to establish a molar ratio of sulphate/L-amino acid of at least 0.5. The molar ratio of sulphate/L-lysine is preferably in this case at least 0.6, 0.8, 0.9 or 0.95, particularly 0.85 to 1.2, preferably 0.9 to 1.1, particularly preferably >0.95 to <1.1.

The molar ratio V of sulphate/L-lysine is calculated according to the formula: $V = 2 \times [SO_4^{2-}]/[L\text{-lysine}]$.

This formula takes into account that the sulphate anion is divalent. A ratio $V=1$ means that a stoichiometric compound $Lys_2(SO_4)$ is present, while a ratio of $V=0.9$ means a 10% substoichiometric amount of sulphate is present and a ratio of $V=1.1$ means a 10% excess of sulphate is present.

Alternatively, it is possible to carry out the fermentation in the presence of an amount of ammonium sulphate such that, on completion of the fermentation, a sulphate/L-amino acid ratio is already present which is in the preferred range according to the invention. In this case, the additional process step can be dispensed with.

Finally, the broth may also be used preferably with sodium bisulphite (sodium hydrogensulphite) or another salt, for example ammonium, alkali metal or alkaline earth metal salt of *sulphurous* acid, which leads to stabilization and brightening of the product.

In this context, a particularly preferred method according to the invention comprises the following steps:
  providing a fermentation broth containing L-lysine;
  optionally partially or completely removing the biomass;
  optionally measuring the ratio of sulphate to L-lysine;
  subsequently optionally adding ammonium sulphate and/or corn steep liquor;
  optionally adding sulphuric acid;
  adjusting the pH, by adding sulphuric acid, to 4.0 to 6.5, particularly 4.9 to 5.1, wherein, by adding the sulphate-containing compound in the steps mentioned above, a ratio of sulphate/L-amino acid in the broth is set to 0.85 to 1.2, particularly preferably 0.9 to 1.0, particularly preferably >0.9 to <0.95;
  optionally concentrating the fermentation broth to a water content of 35 to 70% by weight, particularly 35 to 50% by weight;
  adding a surface-active component, such that a content of surface-active component of 0.025 to 20% by weight, particularly 0.1 to 20% by weight, preferably 0.2 to 15% by weight, particularly preferably 0.3 to 10% by weight, is set;

drying of the mixture to give a particulate composition, preferably by spray granulation;

optionally coating the particle after step with an edible oil, wherein particles are obtained which are completely or partially coated with the edible.

Sulphate-containing compounds in the context of the method steps mentioned above particularly relate to ammonium sulphate and sulphuric acid. In this manner, a product is obtained with an L-amino acid content (particularly L-lysine) of 10 to 70% by weight (calculated as amino acid, based on the total amount) and in the case that the L-amino acid is L-lysine, L-lysine is present in a molar ratio of sulphate/L-lysine of at least 0.5, preferably 0.6, 0.8, 0.9, 0.95, 1.0, 1.05, 1.1, 1.2, more preferably 0.85 to 1.2, preferably 0.9 to 1,1, particularly preferably >0.95 to <1.1.

If acid is added beyond the pH reduction according to the invention, increased amounts of acid are necessary due to the buffering effect of the compounds present in the broth, which may lead to an undesired denaturation and dissolution of the coryneform bacterial cells.

In a method variant according to the invention, one or more of the salts of sulphurous acid (sulphites), selected from the group consisting of ammonium salt, alkali metal salt, and alkaline earth metal salt, is added to the fermentation broth in an amount of 0.01 to 0.5% by weight, preferably 0.1 to 0.3% by weight, particularly preferably 0.1 to 0.2% by weight, based on the fermentation broth. Preference is given to using alkali metal hydrogen sulphite, particularly preferably sodium hydrogen sulphite.

The sulphites, particularly sodium hydrogen sulphite, are preferably added as a solution before concentrating the fermentation broth. The amount used is preferably considered when adjusting the sulphate/L-amino acid ratio.

In the method according to the invention for preparing feed additives containing L-amino acids (particularly L-lysine), those procedures are preferred in which products are obtained comprising constituents of the fermentation broth.

WORKING EXAMPLES

Laboratory Experiments

The laboratory experiments were conducted in a laboratory granulator. The laboratory granulator operates with a fluidized bed. The fermentation broth containing lysine is sprayed into the reactor from above. The fluidized bed supply air may be adjusted in amount and temperature by controllable blower speeds and electrical heating. The air flow is adjusted such that a well-mixed fluidized bed is achieved. The spray nozzle is a pneumatic dual component nozzle. The atomizing air pressure was adjusted to 0.5 bar in each experiment. The broth was preheated to 60° C. and conveyed by means of a peristaltic pump with variable speed settings. The fermentation broth containing lysine was evaporated to a water content of ca. 40% by weight before the spray-drying process and the surface-active substance was subsequently added.

The primary fluidized bed was generated, in which seeds were charged, which were removed from the production and were sieved to a particle size of 200 to 710 μm. The particle density was selected as target parameter, since a good correlation was established between production and laboratory and a direct dependency of the particle size on the bulk density could be detected.

The bulk density was determined as follows: An empty measuring cylinder (250 ml volume) was placed on a balance, filled with the granular product and the weight per unit volume was then determined.

To determine the particle density, the void spaces in the measuring cylinder were filled with methanol. The void volumes could thus be determined by the increase in weight and the known density of methanol (0.7918 g/ml). The difference between total volume and the volume of the methanol gives the particle volume. The particle density is then obtained, by basing the weight of the particle previously determined not on the total volume of the measuring cylinder but on the particle volume determined.

Alternatively, the particle density can also be determined using a pycnometer.

Example 1: Influence of an Antifoaming Agent on the Particle Density

Fermentation broth containing lysine sulphate was evaporated to a water content of ca. 40% by weight. The fermentation broth provided in this manner already comprised 0.13% by weight of antifoaming agent CLEROL FBA 975-US. The fermentation broth was then treated with various amounts of the fatty acid alkylpolyglycol ester (CLEROL FBA 975-US) and was then converted into a granulate using a laboratory granulator. The concentrated fermentation broth was subjected to spray granulation without subsequent addition of the fatty acid alkylpolyglycol ester as comparative example. The influence of the subsequent addition of the fatty acid alkylpolyglycol ester on the particle density can be seen in the following table.

TABLE 1

Influence of an antifoaming agent on the particle density of granulate containing lysine.

| | Particle density [g/cm$^3$] |
|---|---|
| Fermentation broth | 1.133 |
| +0.09% by weight antifoaming agent | 1.137 |
| +0.13% by weight antifoaming agent | 1.155 |
| +0.26% by weight antifoaming agent | 1.145 |

It can be seen that the subsequent addition of the antifoaming agent before carrying out the granulation leads to a distinct increase in the particle density of the resulting granulate.

Example 2: Influence of Lipids on the Particle Density

Fermentation broth containing lysine sulphate was evaporated to a water content of ca. 40% by weight. The fermentation broth provided in this manner already comprised 0.13% by weight of antifoaming agent CLEROL FBA 975-US. The fermentation broth was then treated with various amounts of lipid-containing components. The lipid-containing components used were lecithin (Aquagran CP 100) and also corn steep liquor ("CSL"), which contains lecithin. The fermentation broth was subsequently processed to a granulate in the spray granulation process. The concentrated fermentation broth was used in the spray granulation without subsequent addition of lipid-containing components as comparative example. The results are shown in the following table.

TABLE 2

Influence of lipids on the particle density of granulate containing lysine and the spray rate achievable in the granulation process.

| | Particle density [g/cm$^3$] | Spray rate [g/min] |
|---|---|---|
| Fermentation broth | 1.132 | 9.3 |
| +8.23% by weight CSL | 1.143 | 10.8 |
| +0.025% by weight Aquagran CP 1000 | 1.142 | 10.9 |
| +0.05% by weight Aquagran CP 1000 | 1.147 | 11.4 |
| +0.25% by weight Aquagran CP 1000 | 1.149 | 10.7 |
| +0.5% by weight Aquagran CP 1000 | 1.146 | 11.2 |

It can be seen that the subsequent addition of lecithin and corn steep liquor before carrying out the granulation also leads to a distinct increase in the particle density of the resulting granulate.

In addition to the increased particle density, it was observed that the addition of the surface-active components led to an increased spray rate being achievable at the same energy input in the granulation apparatus and the same granulation air outlet conditions (right-hand column of the table). This means that a more energy-efficient drying process is possible.

Example 3: Influence of Surface-Active Substances on the Granulation Process on a Production Scale On account of the laboratory experiments, corn steep liquor was now used as additive in the production scale preparation of lysine. The comparative experiments were conducted without addition of corn steep liquor.

To conduct the experiments, the fermentation medium was first concentrated after completion of the fermentation to a water content of ca. 40% by weight. Corn steep liquor was then added in an amount of ca. 8% by weight. Corn steep liquor was omitted in the corresponding comparative experiment.

Subsequently, spray granulation was conducted in each case in a granulator. The resulting bulk densities were subsequently determined. The results are shown in the following table.

TABLE 3

Influence of corn steep liquor on the bulk density of granulate containing lysine.

| | Bulk density [kg/m$^3$] |
|---|---|
| Fermentation medium | 620.2 |
| +8% by weight corn steep liquor | 665.4 |

As can be seen, the bulk density is significantly increased by addition of corn steep liquor prior to the spray granulation.

As in the laboratory scale experiments, the spray rates could be increased also on a production scale following addition of corn steep liquor without increasing the residual moisture content. This led to significantly lower outlet temperatures in the granulator air.

The invention claimed is:

1. A method for preparing a feed additive, comprising the following steps:
   a) obtaining a fermentation broth by:
      i) fermenting an L-amino acid-producing microorganism in an aqueous culture medium to produce a fermentation broth;
      ii) after the fermenting step i) is complete: adding surface-active substance to the fermentation broth to a final concentration of 0.025 to 20% by weight; and
   b) drying the fermentation broth obtained in step (a) in order to convert it into said feed additive;
   wherein the concentrations of biomass and surface-active substance in the fermentation broth are such that the feed additive of step b) is a particulate composition with a particle density of at least 1.138 g/cm$^3$.

2. The method of claim 1, wherein the amount of surface-active substance present prior to drying is sufficient to produce a dried feed additive with a particle density of 1.138 to 1.160 g/cm$^3$.

3. The method of claim 1, wherein, prior to drying, the fermentation broth comprises a surface-active substance selected from the group consisting of: corn steep liquor, lipids, antifoaming agents, surfactants and mixtures thereof.

4. The method of claim 1, wherein, prior to drying, the fermentation broth comprises an antifoaming agent selected from the group consisting of: polysiloxanes, mono- and polyglycols, phospholipids and fatty acid glycerides.

5. The method of claim 1, wherein, prior to adding the surface-active substance in step a)ii), the water content of the fermentation broth is adjusted to a value of 35 to 50% by weight.

6. The method of claim 1, wherein, prior to drying, the surface-active substance is present in the fermentation broth in an amount of 0.3 to 10% by weight.

7. The method of claim 1, wherein the L-amino acid is L-lysine, L-methionine, L-threonine, L-valine or L-tryptophan.

8. The method of claim 1, wherein the L-amino acid is L-lysine and, after completion of the fermentation and before the start of the drying, ammonium sulphate and/or sulphuric acid is added to the fermentation broth in order to establish a sulphate/L-amino acid ratio of 0.85 to 1.2.

9. The method of claim 1, wherein the fermentation broth used in drying comprises:
   a) a biomass content of 2 to 12% by weight;
   b) an L-amino acid content of 12 to 48% by weight;
   c) a solids content, including biomass, of 25 to 70% by weight;
   e) a percentage by weight ratio of sulphate to L-amino acid of 0.8 to 1.2;
   d) a surface-active substance content of 0.1 to 20% by weight.

10. The method of claim 9, wherein the fermentation broth used in drying comprises:
   a) a biomass content of 4 to 8% by weight;
   b) an L-amino acid content of 12 to 48% by weight;
   c) a solids content, including biomass, of 35 to 60% by weight;
   d) a surface-active substance content of 0.3 to 10% by weight.

11. The method of claim 1, wherein the feed additive comprises bacteria of the genus *Corynebacterium* or the genus *Escherichia* and/or cell debris from these bacteria.

12. The method of claim 1, wherein said particle density is 1.40-1.55 g/cm$^3$.

13. The method of claim 1, wherein said particle density is 1.44-1.52 g/cm$^3$.

14. The method of claim 1, wherein drying step b) is by spray granulation.

15. The method of claim 1, wherein the feed additive is a granulate with a moisture content of, at most, 3.5% by weight.

16. The method of claim 1, wherein the amino acid content of the dried feed additive is at least 30% by weight.

17. The method of claim 1, wherein the amino acid content of the dried feed additive is 40% to 60% by weight.

18. The method of claim 1, wherein the particles in the feed additive are homogeneous.

19. The feed method of claim 1, wherein the feed additive has cavities of less than 25% by volume.

20. The feed method of claim 1, wherein the feed additive has cavities of less than 10% by volume.

\* \* \* \* \*